United States Patent [19]
Yano et al.

[11] Patent Number: 4,680,239
[45] Date of Patent: Jul. 14, 1987

[54] EXHAUST DEVICE HAVING A HEAT-INSULATING LAYER COMPRISING INORGANIC MICROBALLOONS AND A REFRACTORY LAYER AND METHOD OF MANUFACTURING SAME

[75] Inventors: Mitsuru Yano, Okagaki; Tomoyuki Kido, Kitakyushu; Yoshiyuki Ochi, Mizumaki, all of Japan

[73] Assignee: Hitachi Metals, Ltd., Tokyo, Japan

[21] Appl. No.: 817,687

[22] Filed: Jan. 10, 1986

[30] Foreign Application Priority Data

Jan. 11, 1985 [JP] Japan .................................. 60-2722
Apr. 22, 1985 [JP] Japan ................................. 60-85901

[51] Int. Cl.[4] .......................... B32B 9/00; B32B 7/02; B05D 7/22
[52] U.S. Cl. .................................... 428/688; 428/215; 428/313.3; 428/450; 428/472; 427/181; 427/203; 427/380

[58] Field of Search ............... 428/688, 689, 448, 450, 428/472, 699, 215, 313.3, 313.9, 319.1; 501/96, 103, 106, 118, 119, 127, 133; 427/203, 236, 327, 380, 397.7, 397.8, 419.3, 419.7, 427, 181, 189, 190, 201, 202

[56] References Cited
FOREIGN PATENT DOCUMENTS
58-99180 6/1983 Japan .

Primary Examiner—Marion C. McCamish
Assistant Examiner—Susan S. Rucker
Attorney, Agent, or Firm—Finnegan, Henderson, Farabow, Garrett & Dunner

[57] ABSTRACT

An exhaust device whose inner surface is coated with a heat-insulating layer and a refractory layer. Each layer is formed by conducting at least one cycle of the steps of: (a) coating the inner surface with an inorganic binder solution, (b) immediately adhering a coating powder to the binder solution layer so that the powder is fully and uniformly impregnated with the binder solution, and (c) drying and solidifying it by heat treatment. The coating layer does not suffer from cracking, peeling and breakage.

7 Claims, No Drawings

4,680,239

EXHAUST DEVICE HAVING A HEAT-INSULATING LAYER COMPRISING INORGANIC MICROBALLOONS AND A REFRACTORY LAYER AND METHOD OF MANUFACTURING SAME

BACKGROUND OF THE INVENTION

The present invention relates to an exhaust device for use in internal combustion engines, and a method of manufacturing such an exhaust device.

Exhaust devices, particularly manifolds for internal combustion engines have inner surfaces exposed to high-temperature, high-pressure burnt gas exhausted from engine cylinders. Accordingly, they are heated to high temperatures, permitting large amounts of thermal energy to escape. Since a recent trend is to use the high temperature of exhaust gas to achieve a higher engine performance, it is important to prevent a heat loss from the exhaust device such as a manifold.

Japanese Patent Laid-Open No. 58-51214 discloses a device such as an exhaust manifold for flowing exhaust gas from an internal combustion engine, whose inner surface is coated with a heat-insulating, refractory layer. Since the coating is formed from a slip mixture of refractory material powder, an inorganic binder and water, it must have a high water content which ensures the fluidity of the slip. This leads to shrinkage of the resulting coating layer while drying and solidifying by heat treatment, resulting in the cracking, peeling and breaking of the coating layer.

Further, when suddenly heated by a high-temperature exhaust gas, heat shock tends to provide the inner coating layer with cracks. In addition, since the refractory material powder has generally irregular particle shape, and since the exhaust device such as an exhaust manifold has a complicated inner surface structure, it is extremely hard to provide a refractory layer of a uniform thickness. A further disadvantage of this coating is that since it is made from refractory materials, it has insufficient heat insulation, despite of its good heat resistance, so that a heat easily escapes from the outer surface of the exhaust device through the inner coating layer.

Japanese Patent Laid-Open No. 58-99180 discloses a method of forming a refractory, heat-insulating coating on an inner surface of an exhaust gas-discharging device such as an exhaust manifold for internal combustion engines. This method comprises (a) casting a slip consisting of a refractory powder, an inorganic binder, a frit and water on the inner surface of a metal device which is to be exposed to a high-temperature exhaust gas to form a first heat-resistant coating, (b) attaching a refractory, heat-insulating powder onto the surface of the heat-resistant coating while the heat-resistant coating is still wet, (c) solidifying the resulting heat-insulating coating, and (d) casting a slip consisting of a refractory powder, an inorganic binder, a frit and water on the surface of the refractory, heat-insulating layer to form a second heat-resistant layer. If necessary, the above steps of forming a refractory, heat-insulating layer and a heat-resistant layer may be repeated on the second heat-resistant layer. By this method, three layers of the first heat-resistant layer, the refractory, heat-insulating layer and the second heat-resistant layer are laminated and bonded together to form an integral layer.

This method, however, forms a coating with a slip of coating materials, so the resulting coating inevitably has a relatively high water content. Thus, cracks tend to appear while drying, and large shrinkage takes place while heat treatment. Further, it is highly likely that such coating suffers from peeling and breakage. Likewise, when it is suddenly heated by a high-temperature exhaust gas, heat shock tends to generate cracks on the inner coating.

A further disadvantage of this method which uses a slip to form a heat-resistant coating is that a binder concentration in the coating is inevitably low due to the fact that the slip should have a sufficient fluidity to be coated on the inner surface of an exhaust device as uniformly as possible. A low concentration of the binder leads to an insufficient bonding between the inner surface and the coating layer as well as between the refractory powder particles, resulting in cracks and peeling of the coating.

OBJECT AND SUMMARY OF THE INVENTION

An object of the present invention is, therefore, to provide an exhaust device with a refractory, heat-insulating, inner coating suffering from no cracks, peeling and breakage even by drying, heat treatment and heat shocks during engine operations.

Another object of the present invention is to provide a method of manufacturing such an exhaust device.

In view of the above objects, the inventors have found, through extensive research, that when each of heat-insulating and refractory layers is formed by first coating a binder solution layer on the inner surface of an exhaust device and then adhering a coating consisting of microballoons to the coating binder layer, the resulting layer is uniform, thin and very strong free from cracks, peeling and breakage. The present invention is based on this finding.

The exhaust device according to the present invention comprises a heat-insulating layer composed of a heat-insulating microballoons and an inorganic binder formed on the inner surface of an exhaust device, and a refractory layer composed of a refractory material and an inorganic binder formed on the heat-insulating layer.

The method of manufacturing an exhaust device according to the present invention comprises:

A first step of forming a heat-insulating layer by conducting at least one cycle of the following steps:
(a) coating the inner surface of a metal member with an inorganic binder solution,
(b) immediately adhering a heat-insulating microballoons to the inorganic binder solution layer so that the microballoons are fully and uniformly impregnated with the inorganic binder solution, and
(c) drying and solidifying the resulting heat-insulating microballoon layer by heat treatment, and a second step of forming a refractory layer by conducting at least one cycle of the following steps:
(d) coating the surface of the heat-insulating layer with an inorganic binder solution,
(e) immediately adhering a refractory material to the inorganic binder solution layer so that the microballoons are fully and uniformly impregnated with the inorganic binder solution, and
(f) drying and solidifying the resulting refractory layer by heat treatment.

DESCRIPTION OF THE PREFERRED EMBODIMENTS

Inorganic binders which may be used in the present invention include silicate binders such as sodium silicate, potassium silicate, lithium silicate, phosphate binders such as aluminum dihydrogen phosphate, calcium dihydrogen phosphate, magnesium dihydrogen phosphate, condensed sodium phosphate and phosphoric acid, sol binders such as colloidal silica, colloidal alumina and colloidal zirconia, and ethyl silicate binders.

The binder may be used in the form of an aqueous solution. Its concentration is preferably 20–60 weight %. When it is lower than 20 weight %, the binder cannot show enough bonding strength so that the formed layers may be easily cracked and peeled off. On the other hand, when it exceeds 60 weight %, the binder solution is so sticky that coating operations thereof are difficult. The more preferred range of the binder concentration is 25–55 weight %.

The binder solution may contain an appropriate amount of a hardening agent of the known type. Various hardening agents may be preferably used depending on the types of the binders used. For instance, the preferred hardening agents for the silicate binders include sodium silicofluoride, burnt aluminum phosphate, dicalcium silicate and carbon dioxide gas. And preferable for aluminum phosphate are basic oxides such as magnesia and lime, calcium aluminate, ammonium fluoride, etc.

Heat-insulating materials used for imparting heat-insulating properties to the coating layer may be inorganic heat-insulating materials such as Sirasu balloons (Sirasu is a glassy volcanic ash) and foamed silica. The microballoons have preferably a particle size of 10–500 $\mu$m. When it is smaller than 10 $\mu$m, the heat-insulating layer tends to have cracks and peel off by shrinkage. But when it exceeds 500 $\mu$m, the heat-insulating layer is not easily made flat and smooth. The more preferred particle size of such heat-insulating microballoons is 20–200 $\mu$m.

Refractory materials may be those generally used, such as chamotte, heat-resistant glass (Pyrex glass), silica, cordierite, mullite, alumina, zircon and zirconia. Particularly, zirconia is preferable because it has a low thermal conductivity. The refractory material should have an average particle size of 10–500 $\mu$m. When it is smaller than 10 $\mu$m, the refractory material tends to form agglomerates, making it difficult to form a flat and smooth layer. In this case, the resulting layer is likely to suffer from shrinkage under the influence of high temperatures. On the other hand, when it exceeds 500 $\mu$m, it is difficult to form a flat and smooth layer. The preferred particle size of the refractory material is 20–200 $\mu$m.

The method of manufacturing an exhaust device according to the present invention comprises a first step of forming a heat-insulating layer, and a second step of forming a refractory layer.

In the first step of forming a heat-insulating layer, the inner surface of the exhaust device is first coated with an inorganic binder solution. It is to be noted that the inner surface is covered by a uniform binder solution layer because the solution does not contain any powder. The heat-insulating microballoons are then adhered to the binder solution layer. Any methods of adhering the heat-insulating microballoons may be used as long as the microballoons are strongly adhered to and fully and uniformly impregnated with the binder solution. One example of such methods is to spray the microballoons onto the binder solution layer. Another example is to fill the exhaust device with the microballoons, leave it as it is for a certain period of time so that the microballoons are fully impregnated with the binder solution, and then remove the nonadhered microballoons. In the latter method, appropriate pressure may be applied to the microballoons so that the impregnation of the powder with the binder solution is accelerated. Also, an air blast may be applied to the impregnated microballoon layer to remove any microballoons which are not sufficiently impregnated. Thus, the heat-insulating layer fully impregnated with the binder solution is obtained. The above layer's thickness may vary depending on the concentration and thickness of the binder solution, but it is generally 100–1500 $\mu$m.

The binder solution-impregnated heat-insulating layer formed by the above method contains an extremely small amount of water as compared with the coating layer prepared from a powder slip. This is a noticeable advantage of the present invention. This serves to prevent cracking and peeling of the layer from taking place in the following step of drying and solidification by heat treatment.

The heat treatment of the above layer may be carried out by gradually heating the layer up to about 300° C. Sudden heating should be avoided because it is likely to cause the cracking and peeling of the layer. Preferably, the layer is subjected to spontaneous drying at room temperature, kept at 50° C. for one hour, and then kept at 100° C. for one hour. Further, to enhance the stability of the layer, the layer is preferably heated up to 300° C.

Next, if necessary, the same procedures of the above step may be repeated on the heat-insulating layer. That is, a new binder solution is applied onto the layer, a heat-insulating microballoons are adhered to the binder solution layer, and then the resulting binder-impregnated microballoons layer is dried and solidified by heat treatment. To provide a relatively thick heat-insulating layer, this cycle of the procedures should be repeated a few times. In order to ensure a sufficient heat insulation, the heat-insulating layer should be as thick as 1.5 mm or more.

The second step is to form a refractory layer on the thus formed heat-insulating layer. The refractory layer is formed by first coating the existing heat-insulating layer with an inorganic binder solution adhering a refractory powder to the binder solution layer, and drying and solidifying it by heat treatment. Specific conditions for the formation of the refractory layer are substantially the same as those for the formation of the heat-insulating layer except for the use of a refractory powder. The refractory layer may be formed by one cycle of the above procedures. However, if necessary, this cycle may be repeated a few times. This step provides a refractory layer of 0.5 mm or more in thickness.

After forming a coating layer consisting of the heat-insulating layer and the refractory layer, the exhaust device is heated at 750°–1000° C. for 5–120 minutes to complete coating operations. This heat treatment may be conducted by placing the exhaust device in a high-temperature furnace, or by passing a heated air through ports of the exhaust device.

The present invention will be explained in further detail by the following Example.

EXAMPLE 1

A cast iron manifold used in this Example had an inner surface covered by an oxide layer which was subjected to a degreasing treatment with an alkaline solution of pH10-11.

As a first step, an aqueous solution of 45-weight % sodium silicate ($SiO_2/Na_2O$ molar ratio:2.9) was mixed with 10 weight % of burnt aluminum phosphate (H. B. Hardener manufactured by Hoescht) as a hardener. The resulting mixture was turned into a mist by spraying with 5 kg/cm² of air, and then supplied into a spiral tube connected to the manifold so that it was introduced into the manifold in a spiral flow. Immediately after the inner surface of the manifold was coated with the binder solution, Sirasu microballoons having a bulk density of 0.2 and a particle size of 44–150 μm were sprayed as a heat-insulating material into the manifold.

After the Sirasu microballoons were fully adhered to and impregnated with the binder solution on the inner surface of the manifold, the manifold was kept at room temperature for one hour, and then kept at 50° C. for one hour, and further kept at 100° C. for one hour. Finally, it was heated to 300° C. and kept at that temperature for one hour. This heat treatment completely dried and solidified the heat-insulating layer. These procedures were further repeated twice to form a 3-mm thick heat-insulating layer.

As a second step, the same inorganic binder solution was applied to the surface of the heat-insulating layer. Immediately thereafter, stabilized zirconia particles having a particle size of 44–150 μm were sprayed into the manifold. After removing insufficiently impregnated particles, the same heat treatment as above was performed to form a 0.5-mm thick refractory layer.

The manifold thus provided with the heat-insulating layer and the refractory layer, respectively was kept at 950° C. for 1.5 hours in a furnace to finish the coating operations.

A careful scrutiny of the resulting coating layer revealed no cracks and peeling.

The manifold was subjected to the following tests:

(1) Heat resistance test

A hot air at 850° C. was continuously supplied into the manifold for 100 hours and then cooled to room temperature. No breakage or peeling was observed on the inner coating layer in the manifold.

(2) Heat shock resistance test

A hot air at 1000° C. was introduced into the manifold for 30 minutes, and then the manifold was left to cool to 100° C. This cycle was repeated 150 times on the manifold. No breakage or peeling was observed on the inner coating layer.

(3) Heat insulation test

A hot air at 1000° C. was continuously introduced into the manifold for 30 minutes and temperatures on the outer surface of the manifold were measured. The outer surface of the manifold according to the present invention were 550°–600° C. The same test was conducted on a manifold with no inner coating. It showed that the manifold's outer surface was 800°–850° C. This proves that the manifold of the present invention has excellent heat insulation.

(4) Vibration test

Under vibration conditions of 20 G×280 Hz, the manifold in Example 1 was vibrated continuously for 200 hours. No breakage or peeling was observed on the coating layers of the manifold.

(5) Strain test

The manifold was fixed at its one end and added with a load at the other end to give a ±2-mm strain. This was repeated 100 times. As a result, no breakage or peeling was observed on the coating layer.

(6) All of the above five tests were carried out on the same manifold in Example 1. No breakage or peeling was observed on the coating layer of the manifold.

The above Examples are concerned with manifolds, but it should be noted that the present invention is not limited thereto, and that it is applicable to the inner coatings of any other exhaust devices, such as port liners, front tubes and turbine housings.

As mentioned above, since the heat-insulating layer and the refractory layer are formed by applying the layer-constituting powder to a binder solution already coated on the inner surface of an exhaust device, the resulting coatings before drying contain very little water. This enables the layers to be strongly bonded to the inner surface of the exhaust device, and also enables the constituent particles to strongly adhere and bond to each other. Accordingly, the inner layer thus formed is so strong that it can stand any possible conditions of engine operations without cracks, peeling and breakage. Also, since the inner layer consists of the heat-insulating layer and the refractory layer, it can effectively reduce the heat radiation from the exhaust device.

What is claimed is:

1. An exhaust device comprising:
   a metal portion for passing high temperature exhaust gases therethrough, said metal portion having interior surfaces;
   a heat-insulating layer adhered directly to said interior surfaces, said heat-insulating layer consisting of heat-resistant microballoons having a particle size in the range of from about 10 to 500 μm and an inorganic binder, said heat-insulating layer having a thickness of greater than about 1.5 mm; and
   a refractory layer consisting essentially of a refractory material having a particle size of about 10 to 500 μm and an inorganic binder, said refractory layer overlaying said heat insulating layer and having a thickness greater than about 0.5 mm.

2. A method of manufacturing an exhaust device having on its inner surface a heat-insulating layer and a refractory layer, comprising:
   a first step of forming said heat-insulating layer by conducting at least one cycle of the following steps:
   (a) coating said inner surface with an inorganic binder solution;
   (b) immediately adhering heat-insulating microballoons to the inorganic binder solution layer, said microballoons being fully and uniformly impregnated with said inorganic binder solution; and
   (c) drying and solidifying the resulting heat-insulating microballoon layer by heat treatment; and
   a second step of forming a refractory layer by conducting at least one cycle of the following steps:
   (d) coating the surface of said heat-insulating layer with an inorganic binder solution,
   (e) immediately adhering a refractory material to the inorganic binder solution layer, said refractory material being fully and uniformly impregnated with said inorganic binder solution; and
   (f) drying and solidifying the resulting refractory material layer by heat treatment.

3. The method of manufacturing an exhaust device iof claim 2, wherein said heat-insulating layer is 1.5 to 3.0 mm thick and said refractory layer is 0.5 to 1.5 mm thick, and said heat-insulating microballoons and said refractory material each have a particle size of 10 to 500 μm, and said inorganic binder solution contains 20 to 60 weight % of the binder.

4. A method of manufacturing an exhaust device comprising the steps of:

providing a metal member disposed to conduct high temperature exhaust gases therethrough, said metal member having interior surfaces;

forming a heat-insulating layer on said interior surface, said heat-insulating layer being comprised of a layer of heat-resistant microballoons of from 10 to 500 μm in diameter, said layer having a thickness of at least about 1.5 mm, said heat-insulating layer being formed by conducting at least one cycle of the following steps:

(a) coating said interior surfaces with an inorganic binder solution;

(b) adhering heat-resistant microballoons to the inorganic binder on said surfaces, said microballoons being fully and uniformly impregnated with said inorganic binder solution;

(c) drying and solidifying said heat-insulating layer; and forming a refractory layer from powdered heat resistant refractory material having a particle size in the range of from 10 to 500 μm wherein said refractory layer has a thickness of at least about 0.5 mm, said refractory layer being formed by conducting at least one cycle of the following steps:

(d) coating the surface of said heat-insulating layer with an organic binder solution;

(e) adhering said powdered refractory material to said inorganic binder solution on said heat-insulating layer, said powdered refractory material being fully and uniformly impregnated with said inorganic binder solution; and (f) drying and solidifying said refractory layer.

5. The method of claim 4 wherein said inorganic binder solution contains from 20 to 60 weight % binder.

6. The method of claim 4 wherein said heat-insulating layer has a thickness of less than about 3.0 mm.

7. The method of claim 4 wherein said refractory layer has a thickness of less than about 1.5 mm.

* * * * *